US008434218B2

(12) United States Patent
Nelson et al.

(10) Patent No.: US 8,434,218 B2
(45) Date of Patent: May 7, 2013

(54) CONNECTOR REMOVAL TOOL

(75) Inventors: Keith Nelson, Brooklyn Center, MN (US); Ponharith Nhep, Savage, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 13/027,877

(22) Filed: Feb. 15, 2011

(65) Prior Publication Data

US 2011/0131801 A1 Jun. 9, 2011

Related U.S. Application Data

(62) Division of application No. 11/777,811, filed on Jul. 13, 2007, now Pat. No. 7,900,332, which is a division of application No. 10/827,964, filed on Apr. 19, 2004, now Pat. No. 7,257,888.

(51) Int. Cl.
*B23P 19/00* (2006.01)
*H01R 43/00* (2006.01)

(52) U.S. Cl.
USPC ...................... 29/748; 29/758; 29/764; 7/107

(58) Field of Classification Search .................... 29/278, 29/280, 426.4, 748, 758, 762, 764; 7/107, 7/138, 176; 439/352, 857
See application file for complete search history.

(56) References Cited

U.S. PATENT DOCUMENTS

| | | | | |
|---|---|---|---|---|
| 4,083,101 | A | 4/1978 | Coller | |
| 4,380,118 | A | 4/1983 | Driver et al. | |
| 4,424,625 | A | 1/1984 | Callahan | |
| 4,494,305 | A | 1/1985 | Safai | |
| 5,146,813 | A | 9/1992 | Stanfill, Jr. | |
| 5,965,832 | A | 10/1999 | Davidson | |
| 6,047,464 | A | 4/2000 | Chadbourne et al. | |
| 6,363,560 | B1 | 4/2002 | Kesinger | |
| 6,732,426 | B2 * | 5/2004 | Adams ............................ | 29/762 |

FOREIGN PATENT DOCUMENTS

| | | | |
|---|---|---|---|
| DE | 102 22 747 | A1 | 12/2003 |
| EP | 1 052 744 | A1 | 11/2000 |
| GB | 1 508 214 | | 4/1978 |

OTHER PUBLICATIONS

Twelve (12) photographs of Universal Fiber Tool, part No. P0603793, for Nortel Networks, Ltd., undated.

ADC Telecommunications, Inc., BT-2000, BNC Connector Insertion Tool dated 1999.

* cited by examiner

*Primary Examiner* — Donghai D. Nguyen

(74) *Attorney, Agent, or Firm* — Merchant & Gould P.C.

(57) ABSTRACT

A tool for engaging a telecommunications connector within a slot so that a releasable latch of the connector is released by the tool. The tool may be used to remove a telecommunications connector from a mating opening of a receptacle or may be used to insert a connector within a receptacle.

7 Claims, 6 Drawing Sheets

CONNECTOR REMOVAL TOOL

CROSS REFERENCE TO RELATED APPLICATIONS

This application is a divisional of U.S. Pat. No. 7,900,332 issued Mar. 8, 2011 entitled METHOD OF REMOVING A TELECOMMUNICATIONS CONNECTOR, which claims priority to U.S. Pat. No. 7,257,888 filed on Apr. 19, 2004 entitled CONNECTOR REMOVAL TOOL, the disclosure of both references is incorporate by reference herein in its their entirety.

TECHNICAL FIELD

The present invention generally relates to tools for accessing and removing connectors and, more specifically, relates to tools for accessing and removing telecommunications connectors.

BACKGROUND

Demand for telecommunication infrastructure and bandwidth is increasing. In response to these increased demands, telecommunications providers are increasing the density of existing installations of telecommunications equipment and interconnection points, as well as installing new, densely packed equipment. Many of the new and upgraded installations include racks of equipment with connection locations very tightly positioned with respect to each other. Each of these connection locations is configured to receive a connector mounted to the end of a cable.

When fully populated with equipment and connected, such racks do not provide sufficient clearance between and among connectors and cables for a person to insert their hand to access a connector. Accessing the connectors may adversely impact adjacently mounted connections. Improvements to accessing and removal of telecommunications connectors are desirable.

SUMMARY

The present invention relates to a telecommunications connector tool for a telecommunications connector including a releasable lock and mounted to a telecommunications cable with a strain relief boot mounted about the cable adjacent the connector. The tool includes a tool body with a distal end for engaging a telecommunications connector and a proximal end including a handle. The tool body includes an axial slot extending from the distal end partially toward the proximal end. The slot extends across a width of the distal end and includes a first portion of the slot adjacent the distal end including an enlarged opening for receiving the telecommunications connector. An upper portion of the tool body defines the slot above the enlarged opening and is configured to engage and depress the releasable lock of the connector. A lower portion of the tool body opposes the upper portion and defines the slot below the enlarged opening configured to engage the connector opposite the lock when the upper portion engages the lock. A second portion of the slot proximate the enlarged opening of the slot and positioned opposite the distal end. The second portion includes opposing upper and lower curved surfaces within the slot approximating the shape of the strain relief boot.

The present invention further relates to a method of removing a telecommunications connector from a telecommunications device. A telecommunications connector is removably mounted within a receptacle. The connector includes an end wall positioned opposite the receptacle, a latch for releasably holding the connector within the receptacle and a surface opposite the latch. A connector tool includes a tool body with a distal end and a transverse slot formed through the tool body adjacent the distal end and extending toward a proximal end. The slot includes an enlarged opening adjacent the distal end and the enlarged portion includes an upper extension and a lower extension defining the top and bottom of the slot within the enlarged portion. The connector is engaged with the distal end of the connector tool. The connector tool is extended about the connector so that the connector is received within the enlarged portion of the slot with the end wall positioned adjacent a rear wall of the enlarged portion, the lower portion of the tool adjacent the surface opposite the latch, and the upper portion of the tool depressing the latch and disengaging the connector from the receptacle. The tool is pulled away from the receptacle and the connector is removed from the receptacle.

The present invention also relates to a method of inserting a telecommunications connector into a telecommunications device. A connector tool includes a connector body having a distal end with a transverse slot formed through the tool body adjacent the distal end and extending toward a proximal end. The slot includes an enlarged opening adjacent the distal end, and the enlarged portion including an upper extension and a lower extension defining the top and bottom, respectively, of the slot within the enlarged portion. A mating telecommunications receptacle includes an opening for receiving the telecommunications connector. The telecommunications connector includes an end wall positioned opposite a connection end, a latch for releasably holding the connector within the receptacle and a surface opposite the latch. The connector is engaged with the distal end of the connector tool. The connector tool is extended about the connector so that the connector is received within the enlarged portion of the slot with the end wall positioned adjacent a rear wall of the enlarged portion, the lower portion of the tool adjacent the surface opposite the latch, and the upper portion of the tool depressing the latch. The tool and connector engaged by the tool are positioned adjacent the mating opening of the receptacle and inserted within the opening of the receptacle. The tool is disengaged from the releasable latch of the connector so that the latch engages the receptacle and removing the tool from the connector.

The present invention relates still further to a telecommunications connector tool with a tool body with a distal end and a proximal end. The proximal end includes a handle. The distal end includes a transverse slot extending through the tool and toward the proximal end. The slot includes a connector receiving portion adjacent the distal end. The connector receiving portion includes an upper connector release end with an upper connector receiving space defined by a distal end extension, an upper wall and a rear wall. The connector receiving end also includes a lower connector engaging end opposite the upper connector release end with a rear wall, the rear walls of the upper connector release end and the lower connector engaging end aligned with each other to define the limit of the connector receiving portion. The slot extends from the distal end toward the proximal end beyond the aligned rear walls of the connector receiving portion into a second portion of the slot. The connector receiving portion is sized to receive a telecommunications connector with a releasable latch so that the latch of the connector is engaged by the upper connector release end. The second portion of the slot is sized to receive a telecommunications cable to which the connector may be mounted.

BRIEF DESCRIPTION OF THE DRAWINGS

The accompanying drawings, which are incorporated in and constitute a part of the description, illustrate several aspects of the invention and together with the detailed description, serve to explain the principles of the invention. A brief description of the drawings is as follows.

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

Figure 1:
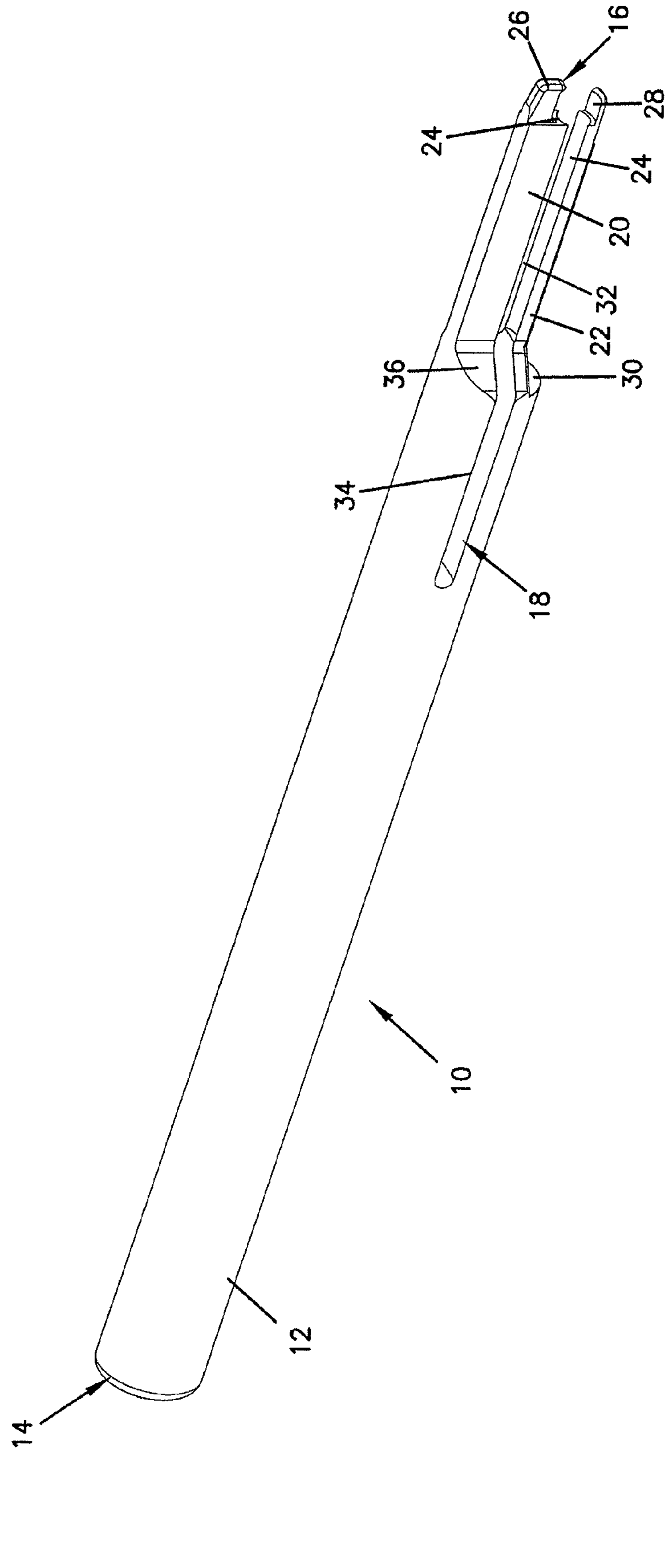
FIG. 1 is a perspective view of a connector removal tool in accordance with the present invention.
Figure 2:
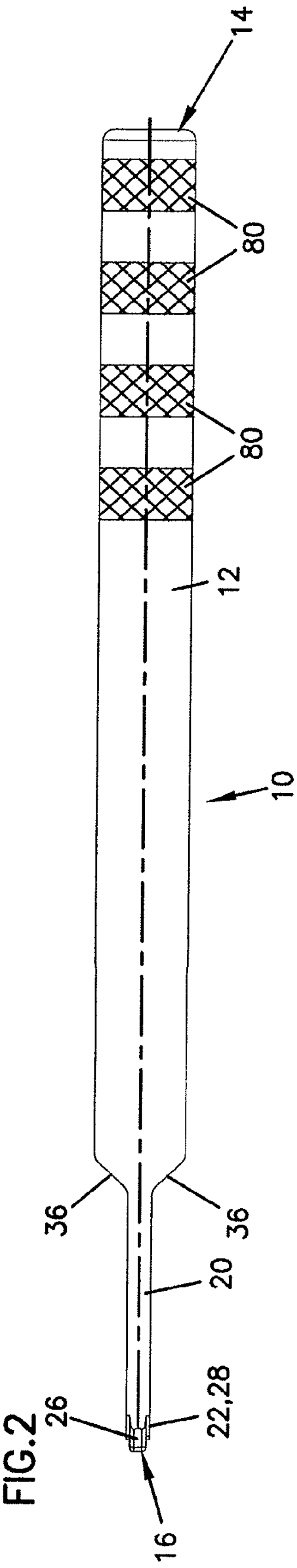
FIG. 2 is a top view of the connector removal tool of FIG. 1.
Figure 3:
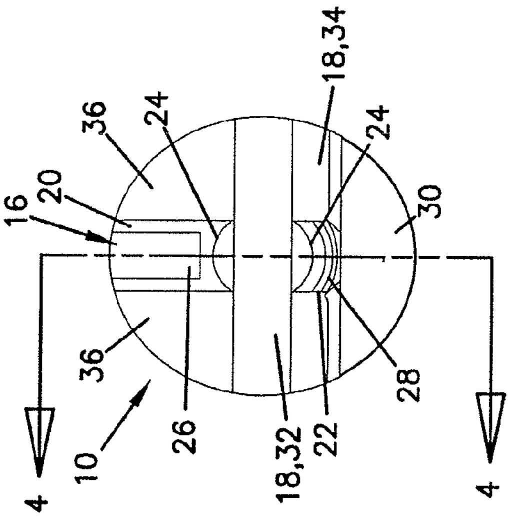
FIG. 3 is an end view of the connector removal tool of FIG. 1.
Figure 4:
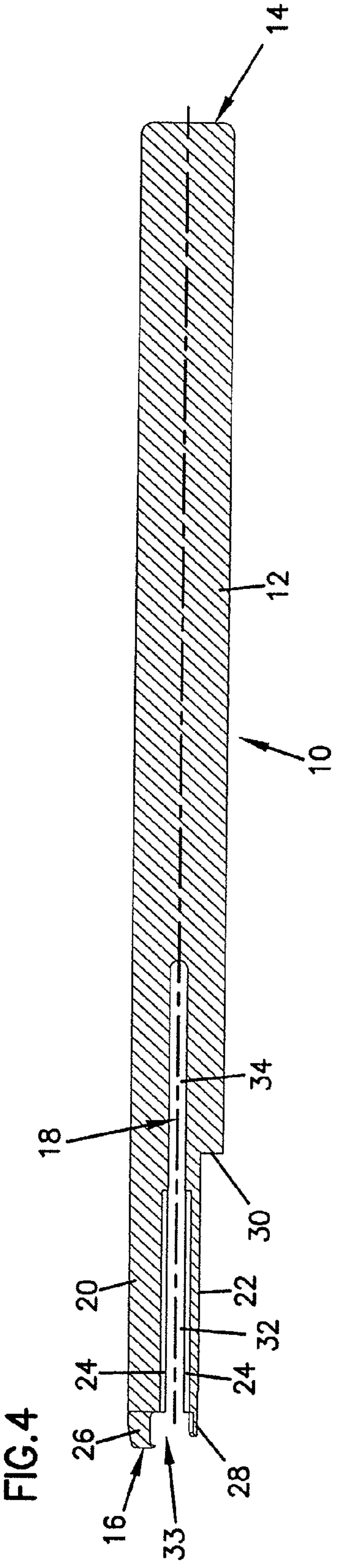
FIG. 4 is a cross-sectional view of the connector removal tool of FIG. 1, taken along line 4-4 in FIG. 3.

FIG. 1 shows a connector removal tool 10 for use with LC format fiber optic telecommunications connectors, which are well known in the telecommunications industry. Tools similar to tool 10 but adapted to work with other formats and styles of telecommunications connectors are anticipated.

Referring now to FIGS. 1 to 4, tool 10 includes a handle 12 adjacent a proximal end 14, and a distal end 16. A transverse slot 18 extends from distal end 16 toward proximal end 14 and handle 12 but does not extend the length of tool 10. Slot 18 includes a first portion or an enlarged opening 33, a second or front portion 32 and a third or rear portion 34. Front portion 32 is defined by the inclusion of a pair of side recesses 36 and a lower recess 30, where handle 12 reduces in size. Side recesses 36 narrow the width of tool 10 adjacent enlarged opening 33 and front portion 32 to approximately the width of the connector to be received within slot 18 (shown below). Rear portion 34 of slot 18 is located toward handle end 14 of recesses 30 and 36. Front portion 32 of slot 18 is located between recesses 30 and 36 and enlarged opening 33 at distal end 16 of tool 10. An upper portion 20 and a lower portion 22 define the upper and lower boundaries, respectively, of slot 18. Inside slot 18 in front portion 32 may be formed a pair of grooved surfaces 24. Formed in the distal end of upper portion 20 within enlarged opening 33 is an upper connector lock release end 26. Formed in the distal end of lower portion 22 within enlarged opening 33 is a lower connector engaging end 28.

Tool 10 is preferably made of a resilient deformable material adjacent slot 18 to permit tool 10 to conform to a connector being engaged by ends 26 and 28. As shown, tool 10 is made of aluminum, although other suitable metallic and non-metallic materials may be used. The material properties used for the distal portions of tool 10 may allow the proximal extension of the slot to be varied without changing the function and utility of tool 10. Handle 12 may include non-slip surface treatments, textures or coatings in one or more areas 80. These treatments, textures or coatings may include, but are not limited to, knurling or cross hatching cut into or raised above the surface of the handle, or non-skid or rubberized surface coatings applied to the handle to improve a user's ability to grip and control tool 10 during use. Alternatively, handle 12 may be made of a different material than those portions of tool 10 adjacent slot 18, and the different material may have surface treatments or characteristics to aid gripping and control.

Figure 5:
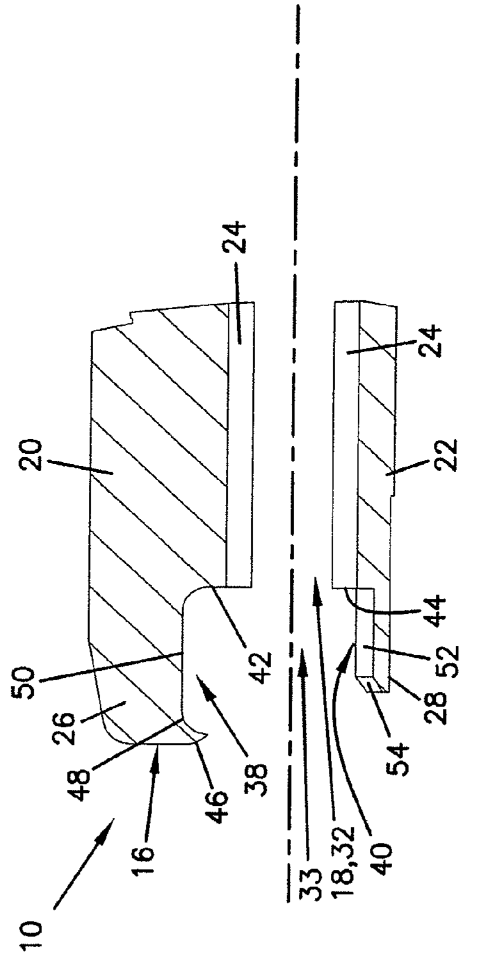
FIG. 5 is an enlarged cross-sectional view of a first end of the connector removal tool of FIG. 4.

Referring now to FIG. 5, upper connector release end 26 defines a space 38 for receiving a releasable locking mechanism or latch of an LC format connector. Upper connector receiving space 38 includes a rear wall 42 to limit the depth to which an LC connector may be inserted within tool 10. Space 38 also includes an extension 46 at the distal end of tool 10 to engage the release tab of an LC connector latch (shown in the FIGS. below). Upper connector receiving space 38 also includes a recess 48 and an upper wall 50 between extension 46 and rear wall 42.

Lower connector engaging end 28 defines a space 40 for receiving a side of an LC format connector opposite the connector's latch. Within lower connector receiving space 40 is a lower wall 52 extending between a tapered entry 54 and a rear wall 44. Rear wall 44 is aligned with rear wall 42 and cooperates within rear wall 42 to limit the insertion of a connector within tool 10.

Figure 6:
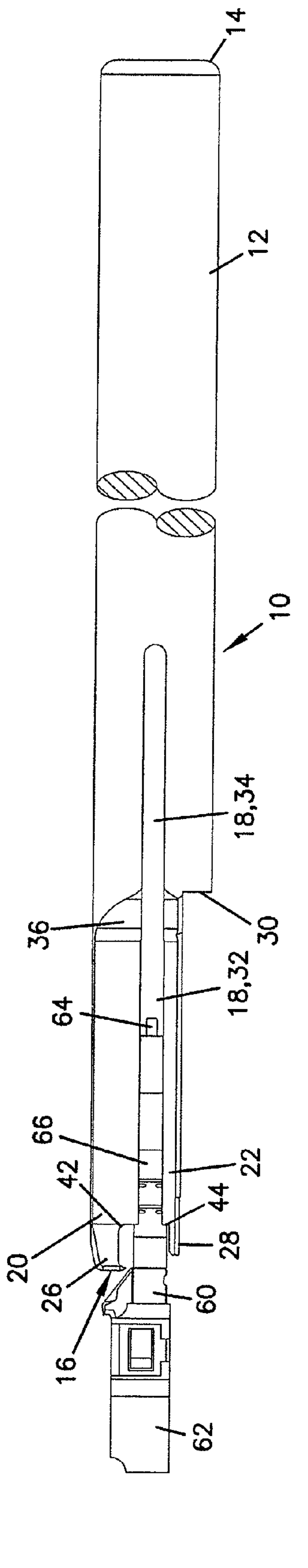
FIG. 6 is a side view of a connector removal tool according to the present invention in position for engaging a telecommunications connector.
Figure 7:
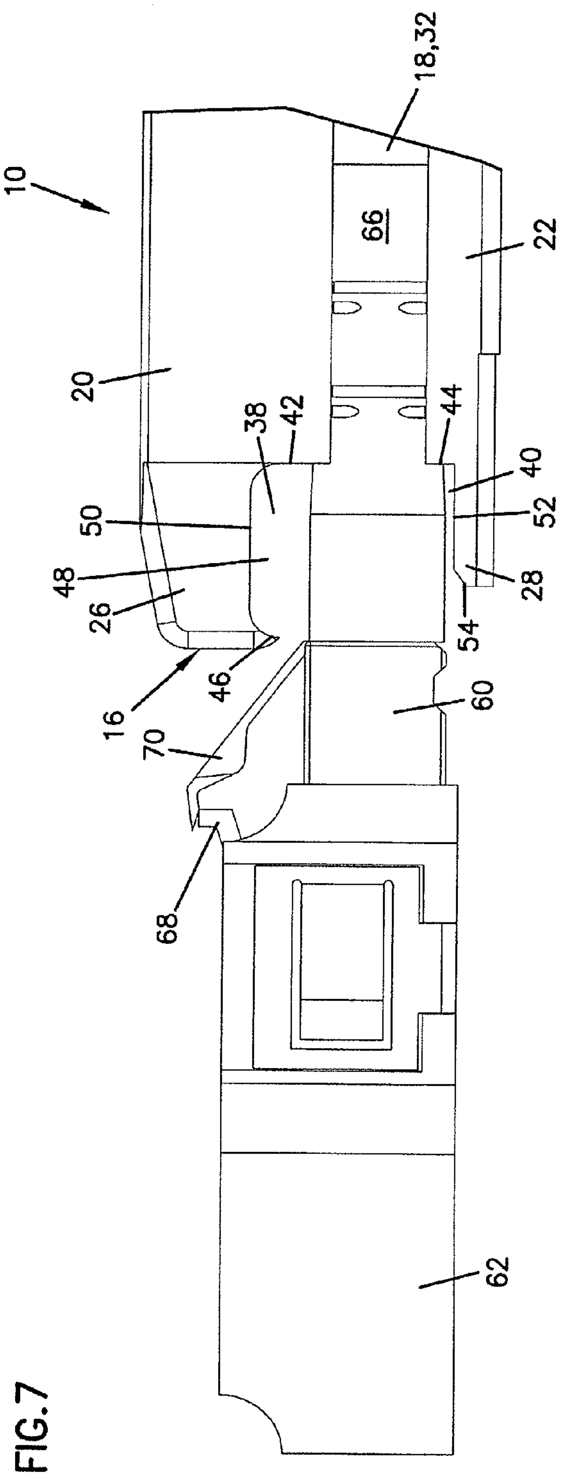
FIG. 7 is an enlarged view of the connector removal tool and connector of FIG. 6.

Referring now to FIGS. 6 and 7, tool 10 is shown in position to engage a connector 60 which is inserted within a fiber optic adapter 62. Connector 60 is mounted to the end of a telecommunications cable 64 and a strain relief boot 66 is mounted about cable 64 adjacent connector 60. Strain relief boot 66 provides support and protection to cable 64. Strain relief boot 66 is greater in diameter than cable 64. Adapter 62 defines a receptacle for receiving and mating with connector 60 and may be mounted to a connection or interconnection panel or other telecommunications devices. Alternatively, adapter 62 may be mounted to a bulkhead to permit connection of cable 64 to another telecommunications cable.

Recesses 24 in upper portion 20 and lower portion 22 are spaced apart to generally match the diameter of strain relief boot 66. As shown in FIGS. 6 and 7, strain relief boot 66 is extending into distal end 16 of tool 10 and a portion of strain relief boot 66 is within front portion 32 of slot 18. Front portion 32 is sized so that the distance from rear walls 42 and 44 to recesses 36 is approximately equal to the length of strain relief boot 66. Recesses 24 extend approximately from rear walls 42 and 44 to recesses 36. If the spacing between recess 24 of upper portion 20 and recess 24 of lower portion 22 is less than the diameter of strain relief boot 66, tool 10 may flex slightly, opening slot 18 to permit entry of strain relief boot 66 within front portion 32.

At the position shown in FIGS. 6 and 7, connector 60 has not yet been engaged by upper connector release end 26 or lower connector engaging end 28. Connector 60 includes a latch 68 extending within adapter 62 to releasably hold connector 60 to adapter 62. A latch lever 70 on connector 60 is positioned outside of adapter 62 to aid in the actuation of latch 68.

Figure 8:
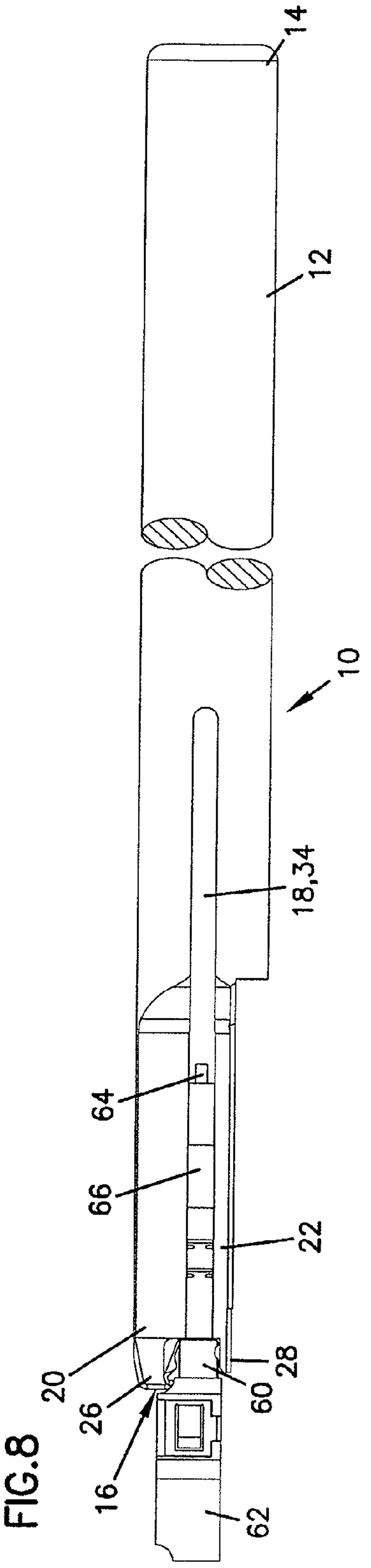
FIG. 8 is a side view of the connector removal tool and connector of FIG. 6, with the tool engaging the connector and releasing the latch holding the connector to an adapter.
Figure 9:
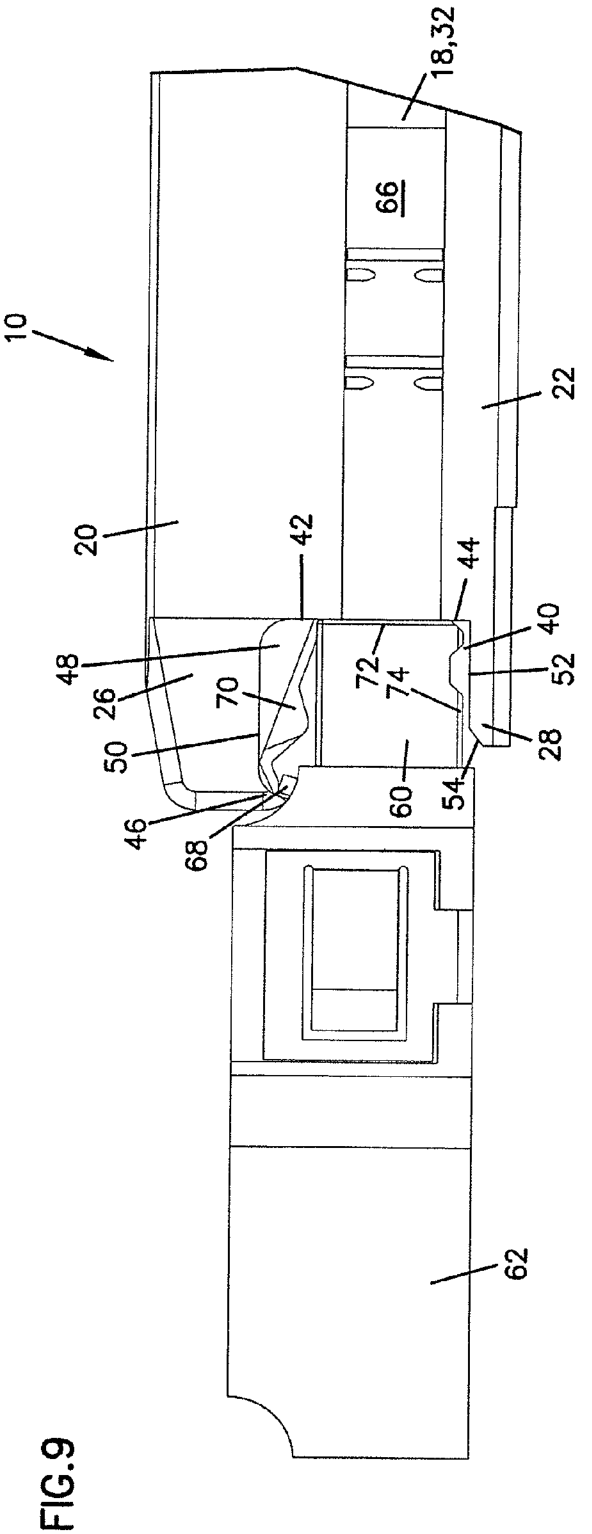
FIG. 9 is an enlarged view of the connector removal tool and connector of FIG. 8.

Referring now to FIGS. 8 and 9, tool 10 is shown positioned about connector 60 with connector 60 fully inserted within tool 10. An outer wall 72 of connector 60 is positioned adjacent rear walls 42 and 44. Extension 46 has passed across lever 70 and lever 70 is now engaged within recess 48 by upper wall 50. Extension 46 is sized so that lever 70 and latch 68 are depressed to a release position as tool 10 is positioned about connector 60. Upper wall 50 is offset upwardly from extension 46 so that lever 70 and latch 68 may spring back slightly, as shown in FIGS. 8 and 9. Upper wall 50 holds lever 70 so that lever 70 depresses latch 68 to a release position, allowing connector 60 to be removed from adapter 62. Extension 46 engages lever 70 and releasably holds connector 60 to tool 10. Extension 46 provides sufficient traction forces to be applied by tool 10 to pull connector 60 from mating adapter 62.

As shown, strain relief boot 66 is fully within front portion 32 of slot 18. Recesses 24 generally conform to the diameter of strain relief boot 66. While tool 10 may be removed from connector 60 by exerting axial pull on handle 12, it is preferred that tool 10 be rotated slightly about strain relief boot 66 so that lever 70 moves to one of either side of upper portion 20 and is released from upper wall 50 of recess 48. In this position, lever 70 is no longer aligned with extension 46, and connector 60 with strain relief boot 66 may be removed from tool 10.

A surface 74 of connector 60 opposite latch 68 and lever 70 is positioned adjacent lower wall 52 within space 40. While surface 74 is not shown directly engaged by lower wall 52, if downward force was exerted on connector 60 within tool 10, lower wall 52 would engage surface 74 and help to prevent connector 60 from being accidentally removed from tool 10.

Figure 10:
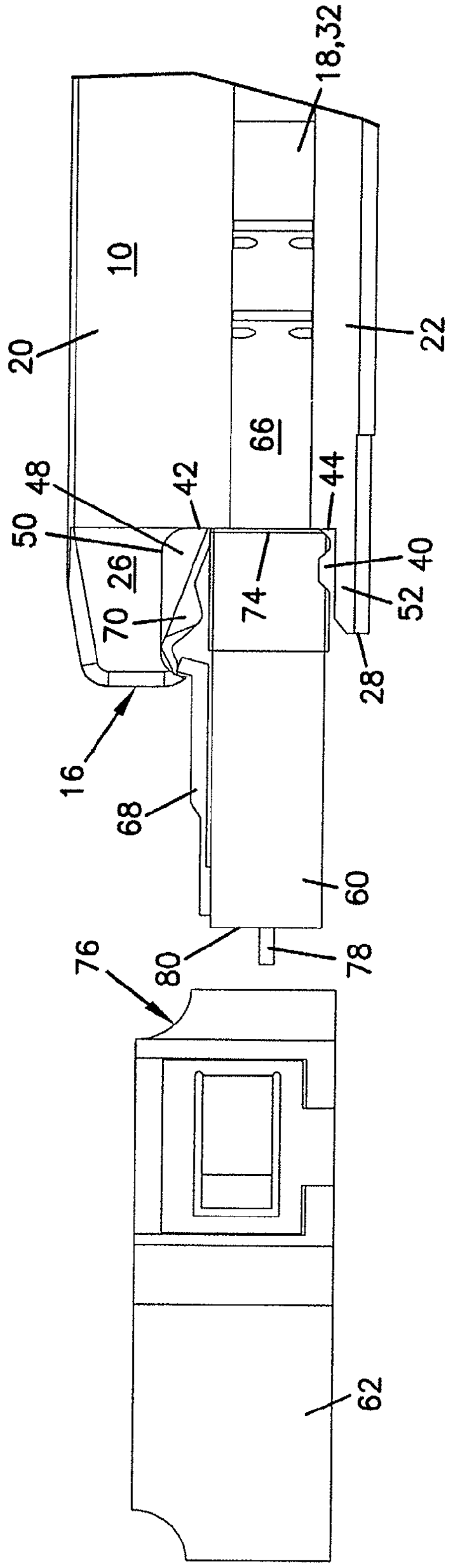
FIG. 10 is a side view of the connector removal tool of FIG. 8 with the connector engaged by the tool and removed from the adapter.

FIG. 10 shows connector 60 within slot 18 of tool 10 and removed from a receptacle 76 within adapter 62. Connector 60 includes a distal end 80 from which a ferrule 78 extends. Ferrule 78 may includes the terminal end of an optical fiber from cable 64, if connector 60 is mounted to and terminates cable 64. While an LC format connector 60 is shown, it is anticipated that tool 10 may be adapted for use with other formats or styles of telecommunications connectors. Suitable connector styles and formats may include a latching mechanism that can be depressed to a release position, similar to what is shown in the FIGS.

Tool 10 may be used as shown to withdraw connector 60 from adapter 62 and may also be used to insert connector 60 into adapter 62. When tool 10 is used to remove connector 60, connector 60 is removed from tool 10 as described above, by rotating connector 60 relative to tool 10 until upper wall 50 and extension 46 no longer engage lever 70. Once extension 46 is disengaged from lever 70, connector 60 and strain relief boot 66 may be withdrawn from slot 18. Alternatively, to insert connector 60 within adapter 62, the process is reversed. Strain relief boot 66 is positioned within recesses 24 inside slot 18. Connector 60 is inserted further within slot 18 until outer wall 72 is adjacent rear walls 42 and 44 and extension 46 has engaged and depressed lever 70 and latch 68. Lever 70 is within recess 48 and held in the depressed position by upper wall 50. Tool 10 can then be used to insert connector 60 within an adapter 62. Once connector 60 is fully inserted within adapter 62, tool 10 is rotated about strain relief boot 66 to disengage extension 46 and upper wall 50 from lever 70 and latch 68. Tool 10 is then withdrawn from about connector 60.

The embodiments of the inventions disclosed herein have been discussed for the purpose of familiarizing the reader with novel aspects of the present invention. Although preferred embodiments have been shown and described, many changes, modifications, and substitutions may be made by one having skill in the art without unnecessarily departing from the spirit and scope of the present invention. Having described preferred aspects and embodiments of the present invention, modifications and equivalents of the disclosed concepts may readily occur to one skilled in the art. However, it is intended that such modifications and equivalents be included within the scope of the claims which are appended hereto.

We claim:

1. A telecommunications connector tool comprising:

a tool body including a distal end for engaging a telecommunications connector and a proximal end defining a handle portion;

the tool body including an axial slot extending from the distal end partially toward the proximal end, the slot extending across a width of the distal end;

a first portion of the slot adjacent the distal end including an enlarged opening for receiving the telecommunications connector, an upper portion of the tool body defining the slot above the enlarged opening including an extension configured to engage a releasable lock of the telecommunication connector during the axial insertion of the tool towards the telecommunication connector, wherein the upper portion of the tool body defining the slot above the enlarged opening includes a recess adjacent to the extension configured to receive a portion of the releasable lock as the tool fully engages with the telecommunication connector; and a lower portion of the tool body opposing the upper portion and defining the slot below the enlarged opening configured to engage the telecommunication connector opposite the releasable lock when the upper portion engages the releasable lock.

2. The telecommunications connector tool of claim 1, wherein a portion of the axial slot positioned opposite the distal end of the tool body includes opposing upper and lower curved surfaces.

3. The telecommunications connector tool of claim 2, wherein the opposing upper and lower curved surfaces define parts of a circle.

4. The telecommunications connector tool of claim 1, wherein the lower portion of the tool body opposing the upper portion includes a tapered distal end.

5. The telecommunications connector tool of claim 1, wherein the distal end of the tool includes side recesses that decrease the width dimension of the tool at its the distal end as compared to the width dimension of the tool at the handle portion.

6. The telecommunications connector tool of claim 1, wherein the distal end of the tool includes lower recesses that decrease the height dimension of the tool at the distal end as compared to the height dimension of the tool at the proximal end.

7. The telecommunications connector tool of claim 1, wherein the upper portion of the tool body extend further in the distal direction than the lower portion of the tool body.

* * * * *